US010285335B1

(12) United States Patent
Murphy

(10) Patent No.: US 10,285,335 B1
(45) Date of Patent: May 14, 2019

(54) PLANTER AND SUPPORT SYSTEM

(71) Applicant: Michael S. Murphy, Fenton, MI (US)

(72) Inventor: Michael S. Murphy, Fenton, MI (US)

(*) Notice: Subject to any disclaimer, the term of this patent is extended or adjusted under 35 U.S.C. 154(b) by 342 days.

(21) Appl. No.: 15/247,217

(22) Filed: Aug. 25, 2016

(51) Int. Cl.
*A01G 9/12* (2006.01)
*A01G 9/02* (2018.01)
*A01G 13/02* (2006.01)
*A01G 9/029* (2018.01)

(52) U.S. Cl.
CPC ............. *A01G 9/025* (2013.01); *A01G 9/029* (2018.02); *A01G 9/12* (2013.01); *A01G 13/0243* (2013.01)

(58) Field of Classification Search
CPC ........... A01G 9/025; A01G 9/022; A01G 9/12
See application file for complete search history.

(56) References Cited

U.S. PATENT DOCUMENTS

| 425,745 | A | * | 4/1890 | Brown | |
|---|---|---|---|---|---|
| 8,186,101 | B2 | * | 5/2012 | Kurtz | A01G 9/12 47/45 |
| 8,935,879 | B1 | * | 1/2015 | Falk | A01G 17/06 47/45 |
| 2017/0318760 | A1 | * | 11/2017 | Legus | A01G 17/06 |
| 2018/0220606 | A1 | * | 8/2018 | Daniel | A01G 9/12 |

FOREIGN PATENT DOCUMENTS

| DE | 102012006685 A1 | * | 10/2013 | ............... A01G 9/12 |
| GB | 2387758 A | * | 10/2003 | ............... A01G 9/12 |

* cited by examiner

*Primary Examiner* — Monica L Williams
(74) *Attorney, Agent, or Firm* — L.C. Begin & Associates, PLLC

(57) ABSTRACT

A plant support assembly having a container and a support assembly retained on the container. The support assembly and the planter have equivalent geometric peripheries that are retained together by a plurality of clamps. The support assembly may also contain a u-channel formed into or fixed to the bottom of the support assembly for fitting the support assembly over the rim of the container.

10 Claims, 4 Drawing Sheets

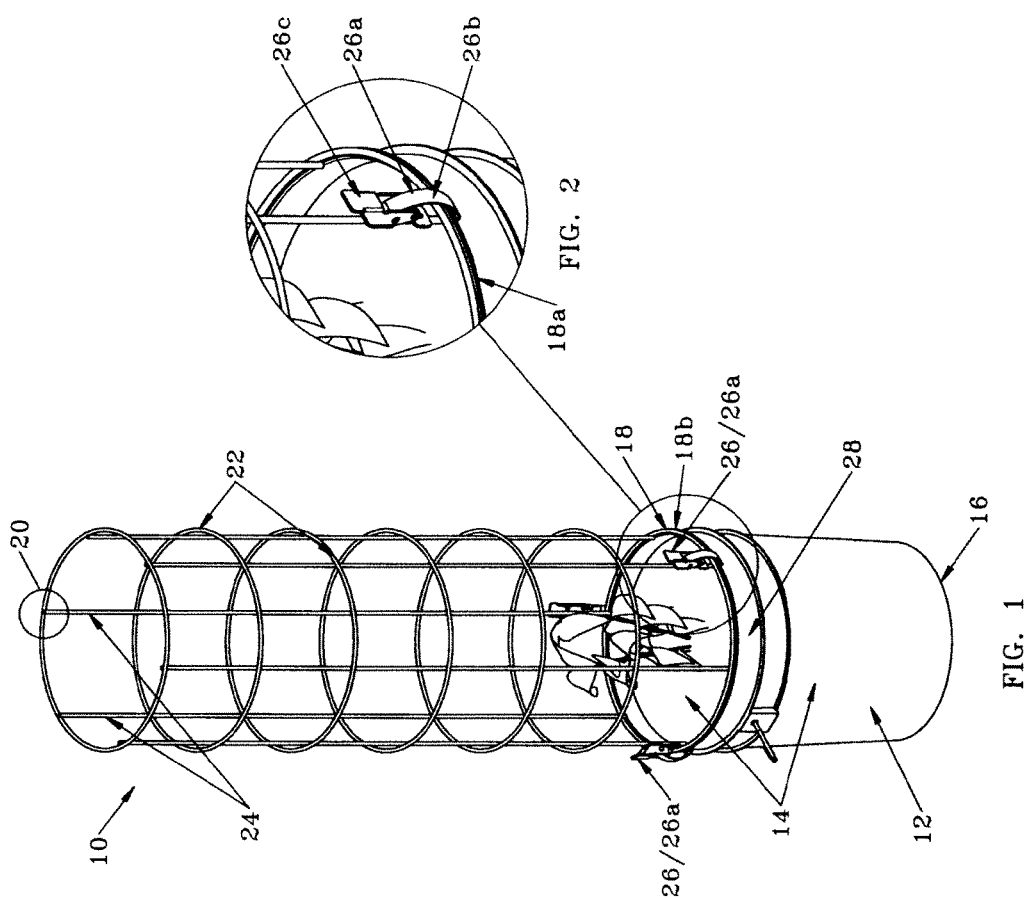

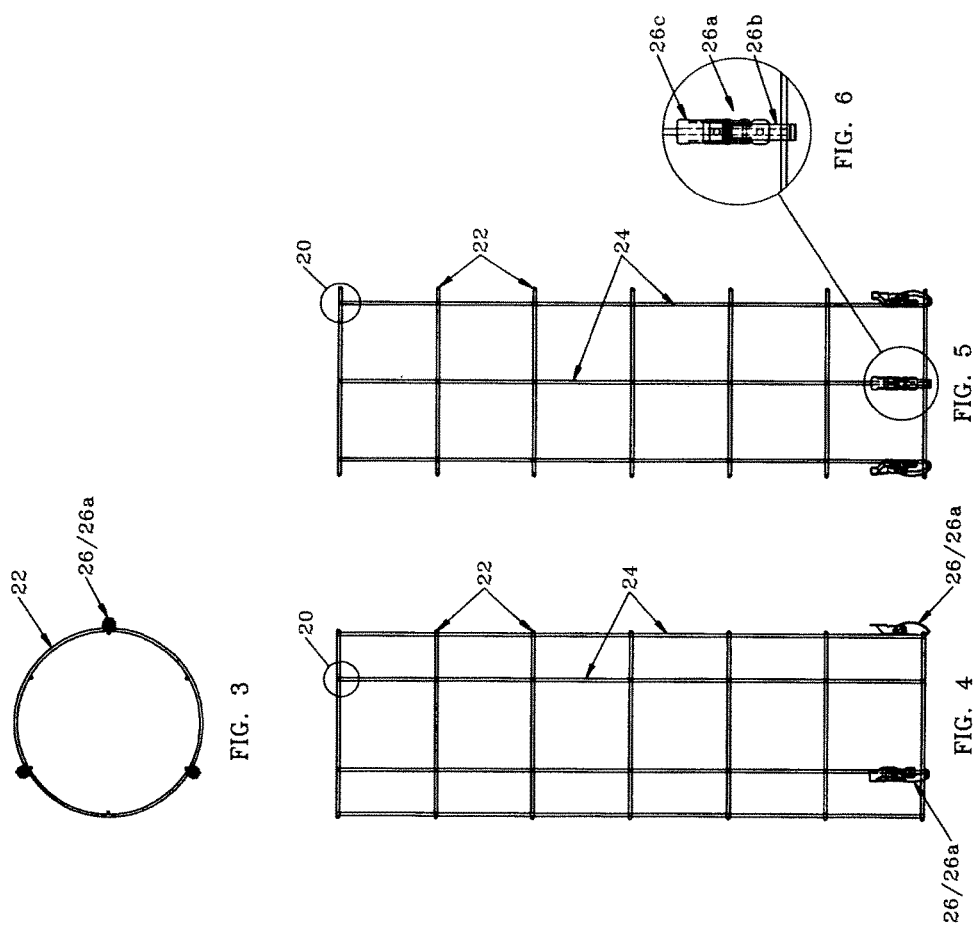

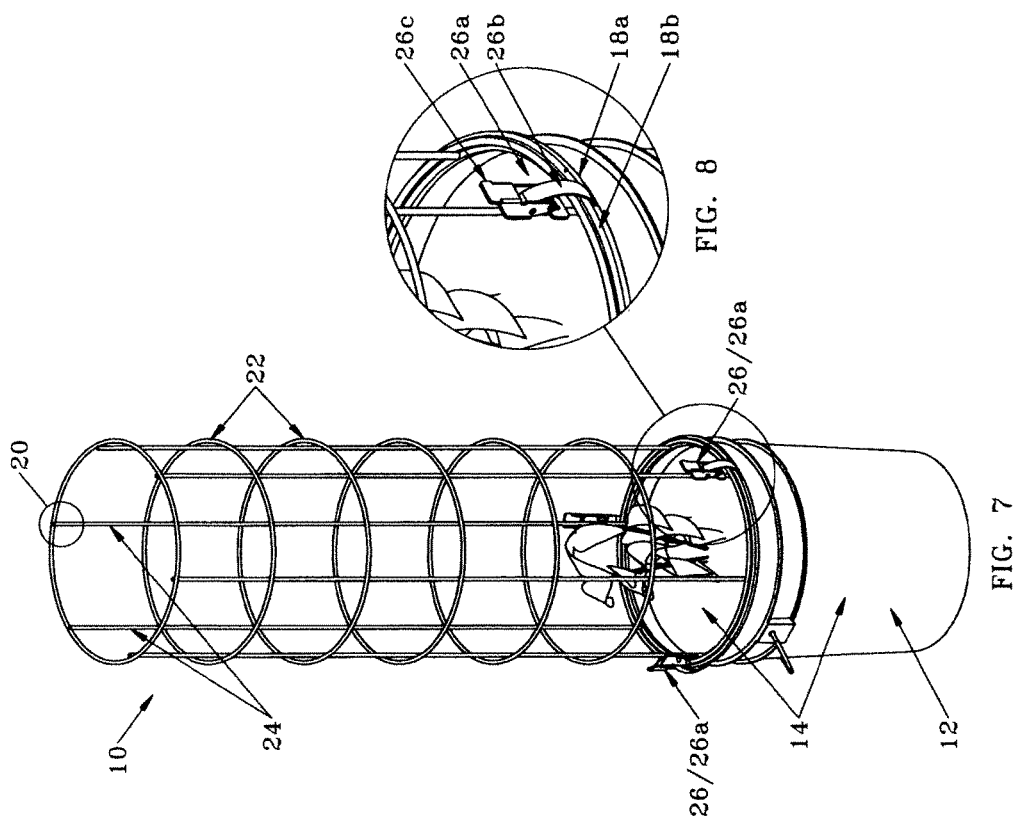

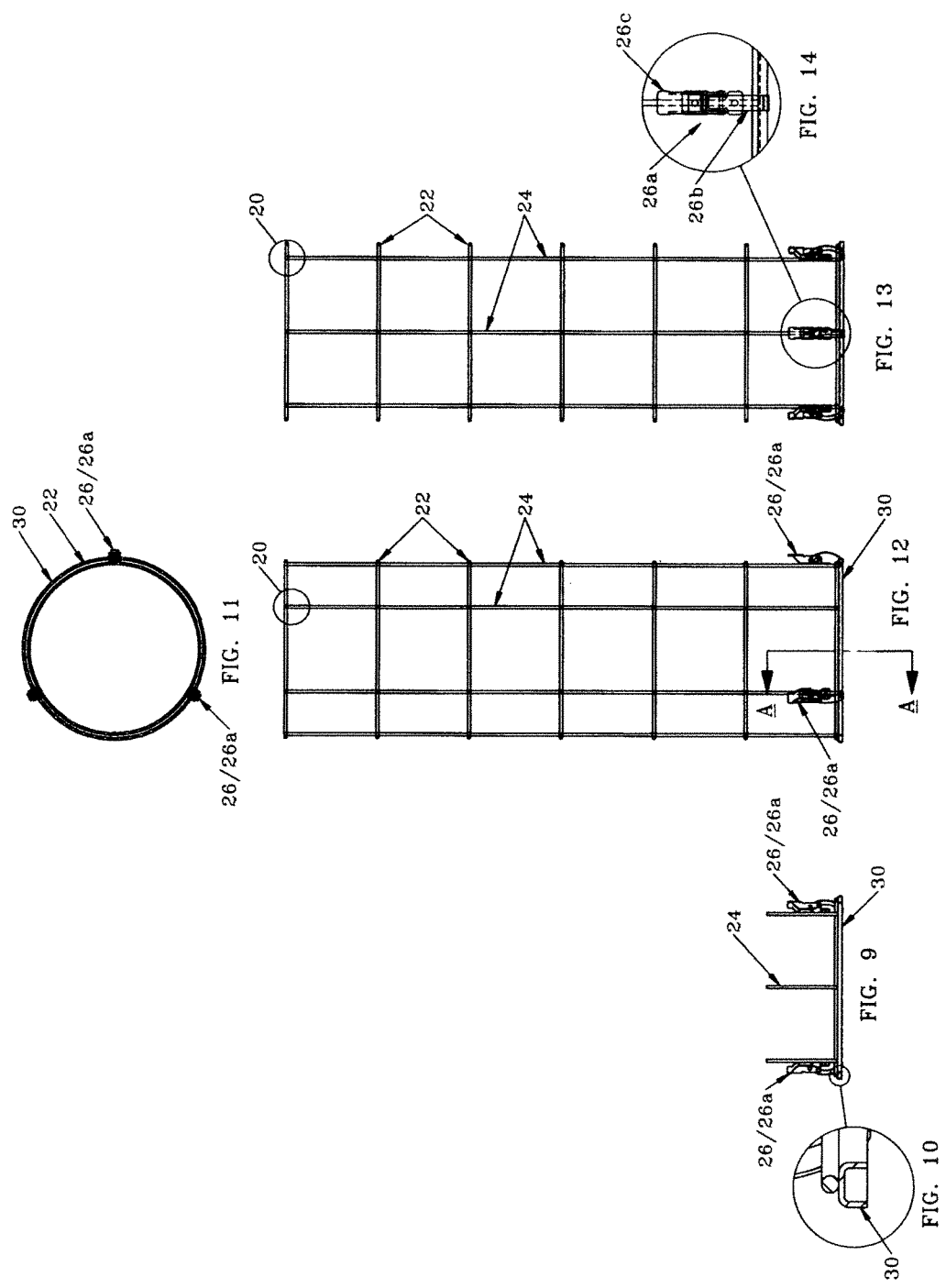

PLANTER AND SUPPORT SYSTEM

TECHNICAL FIELD

The present invention relates generally to a system for planting, wherein the planter and the support structure for foliage, fruit, and/or vegetables are joined together.

BACKGROUND OF THE INVENTION

The present invention relates to a plant container for raising flowers, fruit, vegetables, or plants in general within a portable garden. Plant containers for live goods come in many shapes and sizes and are made from a number of different materials such as clay, terra cotta, and plastics, for example. For climbing plants, or tall plants that can become top-heavy as they mature, a stake or other type of rod is generally inserted in soil in the container to provide support.

The live goods contained within and growing from the planter can cause the stake or rod to topple if the top portion of the live goods becomes heavy and unbalanced, and wind and rain can contribute to this problem. It is also difficult to move containers with growing plants supported by stakes as the stakes tend to fall over as the container is moved.

Certain support systems have been devised that require drilling or forming apertures or holes in the planter or planter system to fit an upper frame or support system in place. These holes or apertures can over time be worn down as the weight of the plant life being supported increases as the plant matures, thereby causing the support system to partially or completely fail at the worn down apertures. Other foundational systems used to fasten or hold a support system may also fail for other reasons, again typically as the weight of the plant being supported increases.

It would therefore be an improvement in the art to provide a container and support for live goods that is easy to move and resistant to toppling, and yet provides continued support even as the plant life matures and the weight of the plant increases.

SUMMARY OF THE INVENTION

Accordingly, it is a principal object of the invention herein to provide an improved planter for growing live plant goods, and especially live plant goods that climb and increase in weight as the plant matures, such as but not limited to, the tomato plant.

It is an additional object of the invention to provide an improved support system for a planter to include a planter support system that is releasably attached to the container.

It is another object of the invention to provide a planter and support system that is easily moved without disturbing the support system.

It is yet another object of the invention to provide a support system for a planter that is firmly retained upon the planter even when the weight of the live plant increases as the plant matures.

These and other objects of the invention are realized by a planter that contains an upwardly open container with one or more side walls, a bottom, and a rim at the top of the planter that sits atop the one or more side walls of the planter. The rim includes a bottom ledge or surface that extends radially outwardly or outwardly from the planter. A planter support system is contained that is formed from one or more hoops or substantially horizontal support members, each of which is connected by a plurality of upwardly or vertically extending metal or tough polymeric ribs or members.

A plurality of clamps is provided that are fixed to the upwardly extending members, for fixing the support member to the rim. Each clamp is welded or otherwise fixed to one upwardly extending member, proximate to the rim. A latch, freely movable on each clamp, is fastenable to an underside ledge or surface of the rim, thereby securing the support system to the rim when the clamp is snapped in place by tightening an associated buckle. Each clamp is similarly attached to the rim. In one embodiment, the clamps are fixed symmetrically about the support system to thereby provide proportional support about the periphery of the planter.

If desired, the very bottom hoop may be formed into an upside-down U-channel to provide a tongue and groove fit over the top surface of the rim. Alternatively, a U-channel may be welded to the bottom hoop whereby the U-channel is then oriented to fit snugly about the rim of the planter. Incorporating the U-channel provides a substantial enhancement of the attachment of the support system to the rim of the planter. If the planter is instead rectangular rather than circumferential in shape, it will be appreciated that the support system will also be rectangular in shape to conform to the shape of the rim of the planter.

The foregoing and other objects and features herein will be readily understood from the following description of the invention and the claims, taken together with the drawings.

BRIEF DESCRIPTION OF THE DRAWINGS

FIG. 1 is a perspective view of a first embodiment of the planter and support system assembly, in accordance with the present invention.

FIG. 2 is a view captured from FIG. 1, of a closed latch assembly used in accordance with the present invention.

FIG. 3 is a view of a hoop or a latitudinal support member used in a support system of the present invention.

FIG. 4 is a view of a support system used in the planter and support assembly of FIG. 1, illustrating closed latches, accordance with the present invention.

FIG. 5 is a second view of the support system of FIG. 1, illustrating closed latches, in accordance with the present invention.

FIG. 6 is a view captured from FIG. 5, of a closed latch assembly, in accordance with the present invention.

FIG. 7 is a perspective view of a second embodiment of the planter and support system assembly, in accordance with the present invention.

FIG. 8 is a view captured from FIG. 7, of a closed latch assembly used in accordance with the present invention.

FIG. 9 is a side view of a bottom hoop containing a U-channel in accordance with the present invention.

FIG. 10 is a cutout view of the U-channel of FIG. 9, in accordance with the present invention.

FIG. 11 is a view of a hoop or a latitudinal support member used in a support system of the present invention, exemplifying the U-channel of FIG. 10.

FIG. 12 is a view of a support system used in the planter and support assembly of FIG. 7, illustrating closed latches, in accordance with the present invention.

FIG. 13 is a second view of the support system of FIG. 7, illustrating closed latches, in accordance with the present invention.

FIG. 14 is a view captured from FIG. 13, of a closed latch assembly, in accordance with the present invention.

DETAILED DESCRIPTION OF THE INVENTION

With reference to FIGS. 1-6, a first embodiment of a planter apparatus 10 generally contains an upwardly open container 12 with one or more side walls 14, a bottom 16, and a rim 18 at the top of the container 12 that sits atop the one or more side walls 14 of the container 12. The rim 18 includes a bottom ledge or bottom surface 18a that extends radially outwardly or outwardly from the planter 12. The rim 18 also includes an upper surface 18b for placement of a support system described below. A planter support system 20 is contained that is formed from one or more hoops or substantially horizontal support members 22, each of which is connected by a plurality of upwardly or vertically extending ribs 24, made from metal, tough polymeric, or other similar types of materials.

The support system 20 sits atop the surface or ledge 18b of the rim 18, whereby both the rim and the support system have substantially the same geometric periphery, such as the same circumference, thereby ensuring that the support system 20 may be placed atop the rim 18 to substantially contact the upper surface 18b of the rim 18 across most if not all of the periphery of both the support system 20 and the rim 18.

A plurality of clamps 26 is provided that are fixed to the upwardly extending members 24, for fixing the support member 20 to the rim 18. A benefit in attaching each clamp to an upwardly extending member is that the clamp may be iteratively calculated to provide a snug fit about the underside of the rim, while yet not providing excessive force. Each clamp 26a is welded or otherwise fixed to one upwardly extending member 24, proximate to the rim 18, such that when engaged to the underside 18a of the rim 18, the clamp in a known manner biases a retaining force between the rim 18 and the clamp 26a. See U.S. Pat. No. 8,186,101, for example, the teachings of which are herein incorporated by reference in its entirety. A latch 26b, freely movable on each clamp 26a, is fastenable to the underside ledge or surface 18a of the rim 18, thereby releasably securing the support system 20 to the rim 18 when the clamp 26a is releasably snapped in place by tightening an associated buckle 26c. Each clamp 26a is similarly attached to the rim 18. In one embodiment, the clamps 26 are fixed symmetrically about the support system 20 to thereby provide proportional support about a periphery 28 of the planter 12. Stated another way, the clamps 26 are equally angularly spaced about the circumferential periphery of the support system 20. If the periphery were rectangular, the clamps 26 would be spaced equidistant from each of the corners of the rectangular rim 18 (not shown), again providing proportional support about the periphery of the rim 18.

The planter 12 may be made from any suitable materials as known in the art, including plastic, metal, terra cotta, and so forth. The planter 12 may be made by known methods such as injection molding or metal-forming methods such as stamping. The support system 20 is preferably made from rod-like metal or tough polymer, but formed in a known manner in the desired shape such as a hoop 22 or rectangle 22, for example.

In a second embodiment of the present invention, as shown in FIGS. 7-12, the very bottom hoop or latitudinal support member 22 may have attached to it an upside-down U-channel 30 to provide a tongue and groove fit over the top surface 18b of the rim 18. In this way, the interface between the support system 20 and the rim 18 is substantially enhanced and the support system 20 is substantially stabilized, particularly as more weight from a mature plant is presented over time. If the planter is instead rectangular rather than circumferential in shape, it will be appreciated that the support system will also be rectangular in shape to conform to the shape of the rim of the planter. Stated another way, the geometric periphery of the support system 20 is substantially equivalent to the geometric periphery of the rim 18 of the container 12. The term "geometric periphery" is essentially meant to convey the length and shape of the outer perimeter of the support system 20 that contacts the rim 18, and, the term "geometric periphery" also refers to the length and shape of the outer perimeter of the rim 18 that contacts the support system 20. Again referring to FIGS. 1-6, in all other ways, the two embodiments are substantially similar.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention. Rather, the scope of the invention is to be determined only by the appended claims and their equivalents.

What is claimed is:

1. A plant support assembly comprising:
   a container comprising a bottom and at least one side wall, and an open top side; a rim formed about the open top side, said rim containing a bottom surface and an upper surface;
   a support assembly comprising a plurality of latitudinal support members and a plurality of upwardly extending support members connecting said latitudinal support members, said support assembly further comprising a bottom support member for attachment to said rim;
   a plurality of clamps, each of said clamps contained on one of said upwardly extending support members, each of said clamps used to provide a retaining force between said rim and said bottom support member to thereby connect said support assembly to said rim; and
   a bottom-oriented latitudinal support member containing a U-channel for fitting said support assembly over said rim.

2. The plant support assembly of claim 1 wherein said plurality of upwardly extending support members extend vertically upward.

3. The plant support assembly of claim 1 wherein said plurality of upwardly extending support members are each orthogonal to said plurality of latitudinal support members.

4. The plant support assembly of claim 1 wherein said U-channel member is fixed to a hoop.

5. A plant support assembly comprising:
   a container comprising a bottom and at least one side wall, and an open top side; a rim formed about the open top side, said rim containing a bottom surface and an upper surface;
   a support assembly comprising a plurality of latitudinal support members and a plurality of upwardly extending support members connecting said latitudinal support members, said support assembly further comprising a bottom support member for attachment to said rim;
   a U-channel fixed to said bottom support member for fitting said support assembly onto the upper surface of said rim; and
   a plurality of clamps used to provide a retaining force between said rim and said bottom support member to thereby connect said support assembly to said rim.

6. The plant support assembly of claim 5 wherein at least one of said plurality of clamps is contained on a corresponding one of said upwardly extending support members.

7. The plant support assembly of claim 5 wherein said plurality of upwardly extending support members extend vertically upward.

8. The plant support assembly of claim 5 wherein said plurality of upwardly extending support members are each orthogonal to said plurality of latitudinal support members.

9. A plant support assembly comprising:
- a container comprising a bottom and at least one side wall, and an open top side;
- a rim formed about the open top side, said rim containing a bottom surface and an upper surface;
- a support assembly comprising a plurality of latitudinal support members and a plurality of upwardly extending support members connecting said latitudinal support members, said support assembly further comprising a bottom support member for attachment to said rim;
- a U-channel formed on said bottom support member for fitting said support assembly onto the upper surface of said rim; and
- a plurality of clamps, each of said clamps used to provide a retaining force between said rim and said bottom support member to thereby connect said support assembly to said rim.

10. The plant support assembly of claim 9 wherein each of said clamps are contained on one of said upwardly extending support members.

* * * * *